(12) United States Patent
Yi et al.

(10) Patent No.: US 8,068,843 B2
(45) Date of Patent: Nov. 29, 2011

(54) METHOD FOR INCREASING SYSTEM CAPACITY BY TRANSMITTING CONTROL SIGNAL FOR MBMS DATA BY COMBINING RLC AND PDCP MESSAGES

(75) Inventors: Seung-June Yi, Seoul (KR); Young-Dae Lee, Gyeonggi-Do (KR); So-Young Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1781 days.

(21) Appl. No.: 10/639,760

(22) Filed: Aug. 13, 2003

(65) Prior Publication Data

US 2004/0103435 A1    May 27, 2004

(30) Foreign Application Priority Data

Aug. 14, 2002  (KR) .................. 10-2002-0048262

(51) Int. Cl.
*H04W 72/00* (2009.01)
(52) U.S. Cl. .................. 455/450; 455/435.2; 455/434; 370/329; 370/312
(58) Field of Classification Search .............. 455/435.1, 455/435.2, 450–452.1
See application file for complete search history.

(56) References Cited

U.S. PATENT DOCUMENTS

| | | | | |
|---|---|---|---|---|
| 6,965,580 | B1 * | 11/2005 | Takagi et al. .................. | 370/312 |
| 2003/0157949 | A1 * | 8/2003 | Sarkkinen et al. ............ | 455/503 |
| 2003/0207696 | A1 * | 11/2003 | Willenegger et al. ......... | 455/522 |
| 2003/0211855 | A1 * | 11/2003 | Sarkkinen et al. ............ | 455/466 |
| 2004/0120302 | A1 * | 6/2004 | Sebire et al. .................. | 370/347 |

FOREIGN PATENT DOCUMENTS

| | | |
|---|---|---|
| CN | 1327690 A | 12/2001 |
| JP | 11-285057 | 10/1999 |
| JP | 2001-197021 | 7/2001 |
| JP | 2001-218245 | 8/2001 |
| JP | 2002-010341 | 1/2002 |
| JP | 2005-525066 | 8/2005 |
| KR | 10-2002-0075108 | 10/2002 |
| KR | 10-2003-0008681 | 1/2003 |
| KR | 10-2003-0080946 | 10/2003 |
| KR | 2003-0080946 A | 10/2003 |
| KR | 10-2003-0086195 | 11/2003 |
| KR | 2003-0086195 A | 11/2003 |
| RU | 2113772 C1 | 6/1998 |
| RU | 2119726 C1 | 9/1998 |
| WO | WO 9823080 | 5/1998 |

OTHER PUBLICATIONS

3GPP, TS 25.321 Release 5, Jun. 2002, 3GPP.*

(Continued)

*Primary Examiner* — Vladimir Magloire
(74) *Attorney, Agent, or Firm* — McKenna Long & Aldridge LLP

(57) ABSTRACT

A method for transmitting a control signal for multimedia service data of UMTS (Universal Mobile Telecommunications System) includes MBMS service data that can be transmitted in a wireless system providing various types of MBMS service. An MBMS scheduling block including an MBMS service identifier list and scheduling information of MBMS RB set information and an MBMS service information block including one MBMS service identifier and MBMS RB set information for a corresponding service are transmitted to a terminal group.

38 Claims, 9 Drawing Sheets

OTHER PUBLICATIONS

Mathias Lott, Rudiger Halfmann, Egon Schultz, Markus Radimirsch, Medium Access and Radio Resource Management for Ad hoc Networks based on UTRA TDD, Oct. 4, 2001, MobiHoc.*

"Multicasting in UMTS," Palat, S.K.; Weerasekera, I.N.; Casati, A.; 3G Mobile Communication 2002. Third International Conference on (Conf. Publ. No. 489) pp. 96-101, May 8-10, 2002.

Discussion of "Hierarchical MBMS Control Information Structure," TSG-RAN Working Group 2 Meeting #32, p. 1-4, Sep. 2002. R2-022569.

Nortel Networks, "Utran Aspects to Support MBMS," 3GPP TSG-RAN WG2 meeting #30, R2-021684, May 27, 2002.

CDMA2000 lx (with English Abstract), Feb. 27, 2002.

Samsung, "Downlink Signaling requirement for MBMS", 3GPP TSG-RAN WG2 Meeting #30, R2-021670, Jun. 2002.

"3$^{rd}$ Generation Partnership Project; Technical Specification Group Services and System Aspects; Multimedia Broadcast/Multicast Service; Architecture and Functional Description (3GPP TR 23.8460.4.0)", XP002223634, Apr. 2002.

XP002249466; "RAN Solution Proposal to Support MBMS" Jun. 6. 2002.

LG Electronics Inc., "Hierarchical MBMS Control Information Structure", 3GPP TSG-RAN Working Group 2 Meeting 31, R2-022136, Aug. 2002, XP002543429.

"Universal Mobile Telecommunications Systems (UMTS); Packet Data Convergence Protocol (PDCP) Specification (3GPP TS 25.323 version 3.3.0 Release 1999)", ETSI TS 125 323, V3.3.0, Sep. 2000, XP002259036.

* cited by examiner

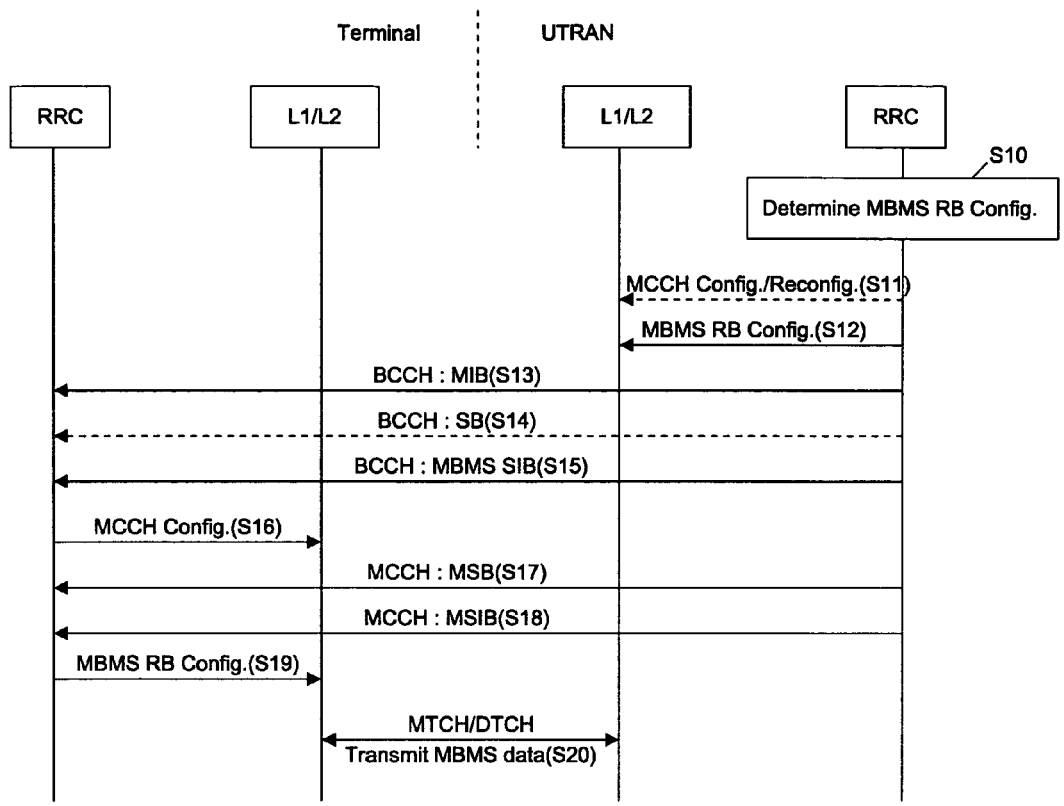
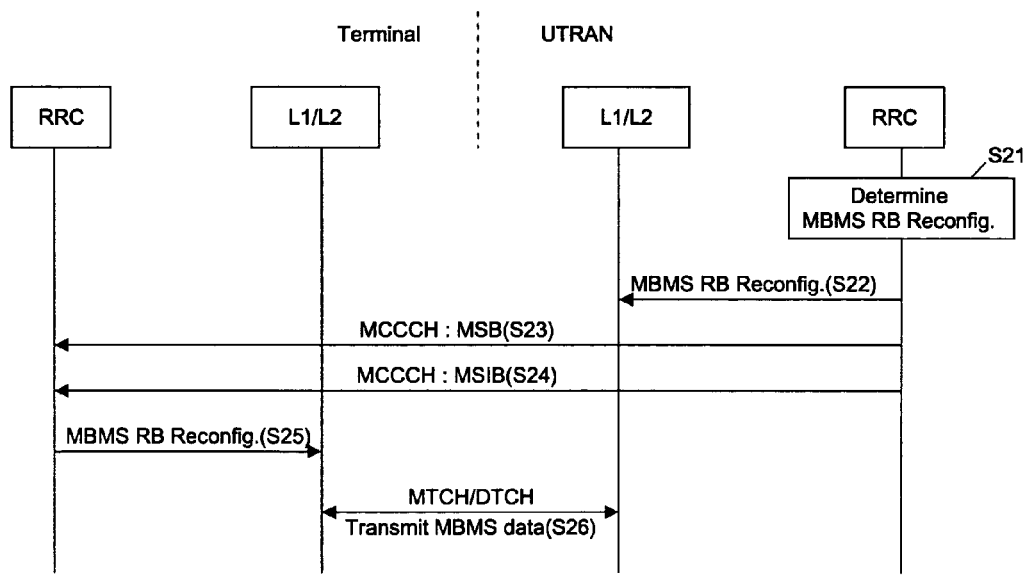

METHOD FOR INCREASING SYSTEM CAPACITY BY TRANSMITTING CONTROL SIGNAL FOR MBMS DATA BY COMBINING RLC AND PDCP MESSAGES

This application claims the benefit of the Korean Application No. P2002-48262 filed on Aug. 14, 2002, which is hereby incorporated by reference for all purposes as if fully set forth herein.

BACKGROUND OF THE INVENTION

1. Field of the Invention

The present invention relates to a multimedia broadcast/multicast service (MBMS) and, more particularly, to a method for transmitting a control signal for transmission of MBMS data in a universal mobile telecommunications system (UMTS).

2. Discussion of the Related Art

A universal mobile telecommunications system (UMTS) is a third generation mobile communication system that has evolved from a standard known as Global System for Mobile communications (GSM). This standard is a European standard which aims to provide an improved mobile communication service based on a GSM core network and wideband code division multiple access (W-CDMA) technology.

FIG. 1 shows a network structure of a general UMTS.

As shown in FIG. 1, the UMTS is roughly divided into a terminal, a UTRAN and a core network.

The UTRAN includes one or more radio network subsystems (RNS). Each RNS includes an RNC and one or more Node Bs managed by the RNCs.

Node Bs are managed by the RNCs, receive information sent by the physical layer of a terminal (e.g., mobile station, user equipment and/or subscriber unit) through an uplink, and transmit data to a terminal through a downlink. Node Bs, thus, operate as access points of the UTRAN for terminal.

The RNCs perform functions which include assigning and managing radio resources, and operate as an access point with respect to the core network.

A primary function of UTRAN is constructing and maintaining a radio access bearer (RAB) for a call connection between the terminal and the core network. The core network applies quality of service (QoS) requirements of end-to-end to the RAB, and accordingly, UTRAN can satisfy the QoS requirements of the end-to-end by constructing and maintaining the RAB.

The RAB service is divided into an Iu bearer service and a radio bearer service of a lower concept. The Iu bearer service handles reliable user data transmission between boundary nodes of UTRAN and the core network, while the radio bearer service handles reliable user data transmission between the terminal and UTRAN.

FIG. 2 illustrates a radio protocol between the terminal and UTRAN on the basis of the 3GPP wireless access network standards.

With reference to FIG. 2, the radio protocol is vertically formed of a physical layer, a data link layer and a network layer, and is horizontally divided into a user plane for transmitting data information and a control plane for transmitting a control signal.

The user plane is a region to which traffic information of a user such as voice or an IP packet is transmitted. The control plane is a region to which control information such as an interface of a network or maintenance and management of a call is transmitted.

In FIG. 2, protocol layers can be divided into a first layer (L1), a second layer (L2) and a third layer (L3) based on three lower layers of an open system interconnection (OSI) standard model well known in a communication system.

The first layer (PHY) provides an information transfer service to the upper layer by using various radio transfer techniques.

The first layer is connected to the MAC layer through a transport channel, and data is transferred between the MAC layer and the PHY layer through the transport channel.

Data is transmitted according to transmission time interval (TTI) through the transport channel. The physical channel transfers data by dividing it by the unit of certain time called a frame. In order to synchronize the transport channel between the UE and UTRAN, a connection frame number (CFN) is used. The CFN value has the range of 0~255 in case of transport channels except for a paging channel (PCH). That is, CFN is repeatedly circulated by the period of 256 frames.

Besides the CFN, a system frame number (SFN) is also used to synchronize the physical channel. The SFN value has the range of 0~4095 and repeated by the period of 4096 frames.

The MAC layer provides a re-allocation service of the MAC parameter for allocation and re-allocation of radio resources.

The MAC layer is connected to the radio link control (RLC) layer through a logical channel, and various logical channels are provided according to the kind of transmitted information. In general, when information of the control plane is transmitted, a control channel is used. When information of the user plane is transmitted, a traffic channel is used.

The MAC is classified into an MAC-b sublayer, an MAC-d sublayer and an MAC-c/sh sublayer according to types of managed transport channels. The MAC-b sublayer manages a BCH (Broadcast Channel) handling broadcast of system information, while the MAC-c/sh sublayer manages shared transport channel such as FACH (Forward Access Channel), DSCH (Downlink Shared Channel), or the like, shared with other terminals.

In UTRAN, the MAC-c/sh sublayer is positioned at a control RNC (CRNC) and manages channels shared by every terminal in a cell, so that one MAC-c/sh sublayer exists in each cell.

The MAC-d sublayer manages a DCH (Dedicated Channel), a dedicated transport channel for a specific terminal. Accordingly, the MAC-d sublayer is positioned at a serving RNC (SRNC) managing a corresponding terminal, and one MAC-d sublayer exists also at each terminal.

A radio link control (RLC) layer supports a reliable data transmission and may perform a function of segmentation and concatenation of an RLC service data unit (SDU) coming from a higher layer. The RLC SDU transferred from the higher layer is adjusted in its size according to a throughput capacity at the RLC layer, to which header information is added, and then transferred in a form of a PDU (Protocol Data Unit) to the MAC layer. The RLC layer includes an RLC buffer for storing the RLC SDU or the RLC PDU coming from the higher layer.

A broadcast/multicast control (BMC) layer performs functions of scheduling a cell broadcast message (CB) transferred from the core network and broadcasting the CB to UEs positioned in a specific cell(s). At the side of UTRAN, the CB message transferred from the upper layer is combined with information, such as a message ID, a serial number or a coding scheme, and transferred in a form of BMC message to the RLC layer and to the MAC layer through a CTCH (Common Traffic Channel), a logical channel. In this case, the logical channel CTCH is mapped to a FACH (Forward Access Channel), a transport channel, and an S-CCPCH (Secondary Common Control Physical Channel), a physical channel.

A packet data convergence protocol (PDCP) layer is an upper layer of the RLC layer, allowing data to be transmitted effectively on a radio interface with a relatively small bandwidth through a network protocol such as the IPv4 or the IPv6. For this purpose, the PDCP layer performs a function of reducing unnecessary control information, which is called a header compression, and in this respect, RFC2507 and RFC3095 (robust header compression: ROHC), a header compression technique defined by an Internet standardization group called an IETF (Internet Engineering Task Force), can be used. In these methods, because the only information requisite for the header part of a data is transmitted, control information is transmitted, so that an amount of data transmission can be reduced.

The RRC layer positioned in the lowest portion of the third layer (L3) is defined only in the control plane and controls the logical channels, the transport channels, and the physical channels in relation to the setup, the reconfiguration, and the release of the RBs. The RB signifies a service provided by the second layer for data transmission between the terminal and UTRAN, and setting up the RB means processes of stipulating the characteristics of a protocol layer and a channel, which are required for providing a specific service, and setting the respective detailed parameters and operation methods.

A broadcast of the system information will now be described.

The broadcast of the system information is one of major function of the RRC layer. The system information includes various information such as system information with which the terminal connects to a network or terminal's mobility support information and measuring information. The system information is transferred through a broadcast control channel (BCCH), a logical channel, and can use the BCH or the FACH as a transport channel.

In order to systematically transmit the system information, the RRC layer constructs a system information block (SIB) by grouping system information with similar characteristics. System information belonging to a different SIB have different characteristics in their transmission repetition period as well as in their content. Substantial system information is included in the SIB, while scheduling information for transmission of the SIB is called on a master information block (MIB) or on a scheduling block (SB).

The MIB, including reference information or scheduling information of SIBs broadcast in a cell, is transmitted regularly through the BCH so that the terminal can easily receive the system information.

Because the MIB includes reference information or scheduling information on one or two SBs and the SB includes additional scheduling information of SIBs, transmission scheduling information of each SIB can be obtained through the MIB and the SB.

The multimedia broadcast/multicast service (MBMS) will now be described.

The MBMS is a service for transmitting multimedia data such as audio, video or image data to plural terminals by using a uni-directional point-to-multipoint bearer service. The MBMS is divided into a broadcast mode and a multicast mode. That is, the MBMS is divided into an MBMS broadcast service and an MBMS multicast service.

The MBMS broadcast mode is a service for transmitting multimedia data to every user in a broadcast area. The broadcast area means a broadcast service available area. One or more broadcast areas may exist in one PLMN, one or more broadcast services can be provided in one broadcast area, and one broadcast service can be provided to several broadcast areas.

The MBMS multicast mode is a service for transmitting multimedia data only to a specific user group existing in a multicast area. The multicast area means a multicast service available area. One or more multicast areas can exist in one PLMN, one or more multicast services can be provided in one multicast area, and one multicast service can be provided to several multicast areas.

In the multicast mode, a user is requested to join a multicast group to receive a specific multicast service. At this time, the multicast group refers to a user group that receives the specific multicast service, and joining refers to a behavior of being admitted to the multicast group intending for receiving the specific multicast service.

An MBMS RB, a radio bearer (RB) for the MBMS, serves to transmit user data of one specific MBMS service transferred from the core network to UTRAN to a specific terminal group. The MBMS RB is divided into a point-to-multipoint RB and a point-to-point RB. In order to provide the MBMS service, UTRAN selects one of the two types of MBMS RBs. In order to select the MBMS RB, UTRAN recognizes the number of users of the specific MBMS service existing in one cell. UTRAN internally sets a threshold value, and if the number of users existing in a cell is smaller than the threshold value, UTRAN sets the point-to-point MBMS RB, whereas if the number of users existing in a cell is greater than the threshold value, UTRAN sets the point-to-multipoint MBMS RB.

FIG. 3 shows one example of a process that UTRAN determines a type of the MBMS RB.

In order to transmit specific MBMS service data, UTRAN should set an MBMS RB for a specific MBMS service. For this purpose, UTRAN transmits a group paging signal to terminals which desire to receive the specific MBMS service (step S1) and initiates a paging timer from a transmission time point. The paging timer is expired when it goes beyond a specific value designated by UTRAN.

When a terminal, which has received the group paging signal, desires to receive the MBMS service, the corresponding terminal transmits a paging response signal to UTRAN (step S2). A RRC Connection Setup Request message services as the paging response signal. UTRAN can receive paging response signals from one or more terminals, and receives the paging response signal from terminals until the paging timer is expired.

When the paging timer is expired, UTRAN counts paging response signals received until then, and calculates the number of terminals that desire to receive the MBMS service in the corresponding cell (step S3). UTRAN compares the threshold value and the calculated number of terminals and sets a point-to-multipoint MBMS RB or a point-to-multipoint MBMS RB.

For transmission of the MBMS, UTRAN may operate two types of logical channels for MBMS in each cell: an MBMS control channel (MCCH) and an MBMS traffic channel (MTCH). One MCCH is used to send MBMS-related control information to one or more terminal groups. One MTCH is used to send user data of a specific MBMS service to a terminal group. There is one-to-one correspondence between an MTCH and an MBMS service. The point-to-multipoint MBMS RB for a specific MBMS service consists of the MTCH as well as a corresponding transport channel and a corresponding physical channel.

In the conventional art, common channel configuration information for broadcast or multicast are all transferred to the BCCH. That is, UTRAN transmits the system information block (SIB) including common channel configuration information through the BCCH regardless of a common traffic channel (CTCH) and a common control channel (CCCH). Therefore, if this method is applied to the MBMS, the MTCH and the MCCH configuration information are all to be transmitted through the BCCH.

In this respect, however, in the case of the MBMS service, various services are broadcast or multicast, so that the BCCH has to provide various configurations of MTCH channels. Thus, transmission of all the MTCH and MCCH data through the BCCH causes the current construction of system information transmitted through the BCCH to be changed. In the conventional art, in general, the RB is set up by using a radio bearer setup procedure of the RRC or system information of the RRC.

In the method of using the radio bearer configuration (setup) procedure, UTRAN transmits a radio bearer setup message for transferring RB setup information to one specific terminal, and then the corresponding terminal sets up an RB and transmits a radio bearer setup completion message to UTRAN.

Meanwhile, in the method of using system information, a terminal obtains setup information of a specific RB from system information broadcast by UTRAN and sets up a corresponding RB.

The former method is used when one terminal sets up a specific RB, while the latter method is used when one or more terminals sets up a specific RB. A difference between the two methods is that the former method requires a response message of the terminal while the latter method does not require a response message of the terminal.

Accordingly, in case of setting up the MBMS RB by using the former method is disadvantageous in that radio bearer setup messages in proportion to the number of terminals belong to a terminal group should be transmitted and received, a radio capacity is much taken.

Thus, setup of the MBMS RB in a method similar to the RB setup through the system information is advantageous in terms of the radio capacity, but no process has been substantially defined for setting up the MBMS RB.

The above references are incorporated by reference herein where appropriate for appropriate teachings of additional or alternative details, features and/or technical background.

SUMMARY OF THE INVENTION

Accordingly, the present invention is directed to method for transmitting control signal for MBMS data in wireless mobile communication system that substantially obviates one or more problems due to limitations and disadvantages of the related art.

An advantage of the present invention is a control signal transmission method for transmitting system information and MBMS control information through different logical channels.

Another advantage of the present invention is a control signal transmission method capable of transmitting radio bearer related information on a specific service discriminatively by services.

Another advantage of the present invention is a control signal transmission method capable of transmitting MBMS-related control information to a dedicated channel-set terminal through a dedicated control channel (DCCH).

Another advantage of the present invention is a control signal transmission method capable of transmitting MBMS-related control information to a common channel-set terminal through an MBMS common control channel (MCCH).

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof, as well as the appended drawings.

To achieve these and other advantages and in accordance with the purpose of the invention, as embodied and broadly described herein, there is provided a control signal transmission method in a wireless communication system providing a multimedia broadcast/multicast service (MBMS) to a terminal group including plural terminals, in which system information and control information for an MBMS service are transmitted through different logical channels.

Preferably, the MBMS system information is transmitted through a broadcast control channel (BCCH).

Preferably, the MBMS system information includes: an MBMS system information block (MBMS SIB) for transmitting MBMS-related system information and a block for transmitting scheduling information on the MBMS SIB.

Preferably, the MBMS SIB includes setup information of a common control channel transmitting the MBMS control information.

Preferably, the MBMS control information is transmitted through a logical channel providing information on one or more MBMS services.

Preferably, the logical channel is an MBMS common control channel (MCCH).

Preferably, the MBMS control information includes: an MBMS scheduling block (MSB) and plural MBMS service information blocks (MSIB).

Preferably, the MSIB includes service-specified information, and the service-specified information is radio bearer information or setup information of an MBMS traffic channel (MTCH).

Preferably, one MSIB transmits only one service-related information.

To achieve at least these advantages in whole or in parts, there is further provided a control signal transmission method in a wireless system multicasting service data to a terminal group including plural terminals, including: transmitting system information through a first logical channel; transmitting specific service-related control information through a second logical channel; and transmitting a specific service data through a third logical channel.

Preferably, the specific service is a multimedia broadcast/multicast service (MBMS).

Preferably, the first logical channel is a broadcast control channel, the second logical channel is an MBMS control channel (MCCH), and the third logical channel is an MBMS traffic channel (MTCH).

Preferably, the system information includes an MBMS system information block (MBMS SIB) for transmitting MBMS-related system information and a block for transmitting scheduling information on the MBMS SIB.

Preferably, the MBMS SIB includes setup information of the second logical channel transmitting MBMS control information.

Preferably, the first logical channel provides setup information of the second logical channel, and the second logical channel provides setup information of the third logical channel.

Preferably, the service-related control information is transmitted by blocks, and one block transmits only one service-related control information.

Preferably, the service-related control information includes an MBMS scheduling block (MSB) and plural MBMS service blocks (MSIB).

Preferably, the MSIB includes a service-specified information, and the service-specified information is radio bearer information or setup information of an MBMS traffic channel (MTCH).

Preferably, one MSIB transfers only one service-related information.

To achieve at least these advantages in whole or in parts, there is further provided a control signal transmission method in a wireless system transmitting service-related control information to a terminal group including plural terminals, in which specific service-related control information is transmitted by blocks through a common control channel.

Preferably, the specific service is a multimedia broadcast/multicast service (MBMS).

Preferably, one block transmits only one service-related control information.

Preferably, the service-related control information is service-specified information, and the service-specified information is radio bearer information or setup information of a logical channel providing information on a specific service.

Preferably, the logical channel providing information on the specific service is an MBMS traffic channel (MTCH).

Preferably, the service-related control information is an MBMS service information block (MSIB).

To achieve at least these advantages in whole or in parts, there is further provided a control signal transmission method in a wireless communication system providing a multimedia broadcast/multicast service (MBMS) to a terminal group including plural terminals, including: constructing MBMS scheduling block (MSB) by services; constructing an MBMS service information block (MSIB); and transmitting the MSB and the MSIB to a terminal group through different logical channels.

Preferably, the MSB is transmitted through a broadcast control channel, and the MSIB is transmitted through an MBMS control channel (MCCH).

Preferably, the MSIB transmits services by blocks, and one block transmits only one service.

Preferably, the MSIB transmits service-specified information.

Preferably, the service-specified information is radio bearer information or setup information of a logical channel providing information on a specific service.

Preferably, the MSB includes: an MBMS service identifier list; MSIB transmission scheduling information; and MSIB update information.

Preferably, the transmission scheduling information is a time indicator such as a system frame number (SFN) indicating time at which one MSIB is transmitted through a physical channel.

Preferably, the update information also includes MSIB update information, and is sequentially increased from an initial value to a limit value whenever information of a specific block (i.e. a specific MSIB) is updated, and then set as an initial value.

Preferably, the MSIB includes: one MBMS service identifier; and radio bearer (RB) configuration (setup) information for a corresponding service.

Preferably, the RB setup information includes: time information at which the MBMS RB is activated; setup information of every channel constituting the MBMS RB; and setup information of every layer.

To achieve at least these advantages in whole or in parts, there is further provided a control signal transmission method in a wireless communication system providing a multimedia broadcast/multicast service (MBMS) to a terminal group including plural terminals, including: receiving system information through a broadcast control channel; obtaining setup information of an MBMS control channel (MCCH) from the system information and setting up an MCCH channel; receiving MBMS control information through the set MCCH channel; setting up an MBMS traffic channel (MTCH) by using MBMS control information and receiving MBMS data through the MTCH.

Preferably, the control information receiving step includes: receiving an MBMS scheduling block (MSB); receiving a specific MSIB by using scheduling information of an MBMS service information block (MSIB) included in the MSB; obtaining setup information of a radio bearer (RB) from the received MSIB; and setting the obtained RB setup information in a terminal and receiving specific MBMS data through the set RB.

Preferably, the MSIB receives services by blocks, and one block includes only one service.

Preferably, the MSIB transmits a service-specified information, and the service-specified information is radio bearer information or setup information of a logical channel providing information on a specific service.

Preferably, the MSB includes: an MBMS service identifier list; MSIB transmission scheduling information; and MSIB update information.

Preferably, the transmission scheduling information is a time indicator such as a system frame number (SFN) indicating time while one MSIB is transmitted through a physical channel.

Preferably, the update information also includes MSIB update information, and is sequentially increased from an initial value to a limit value whenever information of a specific block is updated, and then set as an initial value.

Preferably, the MSIB includes: one MBMS service identifier; and radio bearer (RB) setup information for a corresponding service.

Preferably, the RB setup information includes: time information when the MBMS RB is activated; setup information of every channel constituting the MBMS RB; and setup information of every layer.

Preferably, the MSIB receiving step includes: receiving an MSB through a common control channel; obtaining a block update information of the MSB and checking whether the MSB has been updated; obtaining transmission scheduling information and update information of an MSIB from a corresponding MSB if the MSB has been updated; checking whether the MSIB has been updated by using the update information; and receiving a specific MSIB during a section indicated by the transmission scheduling information if the MSIB has been updated.

Preferably, current update information of the MSIB obtained from the MSB and previous update information of the MSIB obtained from the MSB are compared, and if the two update information values are different, it is judged that a content of the corresponding MSIB has been updated.

Preferably, if the two update information values are identical, it is judged that a content of the corresponding MSIB has not been updated and an MSIB is not received.

Preferably, the terminal group can receive a channel other than the common control channel for certain time which is not indicated by the transmission scheduling information, or temporarily stop receiving every channel.

To achieve at least these advantages in whole or in parts, there is further provided a control signal transmission method in a wireless communication system providing a multimedia broadcast/multicast service (MBMS) to a terminal group including plural terminals, wherein MBMS-related control information is transmitted to a terminal, for which a specific transport channel has been set, through a logical channel corresponding to the corresponding transport channel.

Preferably, MBMS-related control information is transmitted to a terminal, for which a dedicated channel has been set, through a dedicated control channel (DCCH).

Preferably, the MBMS-related control information is MBMS traffic channel (DTCH or MTCH)-related information.

Preferably, the MBMS-related control information is MBMS radio bearer (RB) re-setup information.

Preferably, MBMS-related control information is transmitted to a terminal, for which a common channel has been set, through an MBMS control channel (MCCH).

Preferably, the MBMS-related control information is MBMS traffic channel (MTCH or DTCH)-related information.

Preferably, the MBMS-related control information is MBMS radio bearer (RB) re-setup information.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIG. 6 illustrates a method of transmitting and receiving MBMS control information and setting up an MBMS RB when a cell initially provides a specific MBMS service;

FIG. 7 illustrates a first embodiment of resetting an MBMS RB in accordance with the present invention;

DETAILED DESCRIPTION OF THE ILLUSTRATED EMBODIMENTS

Figure 1:
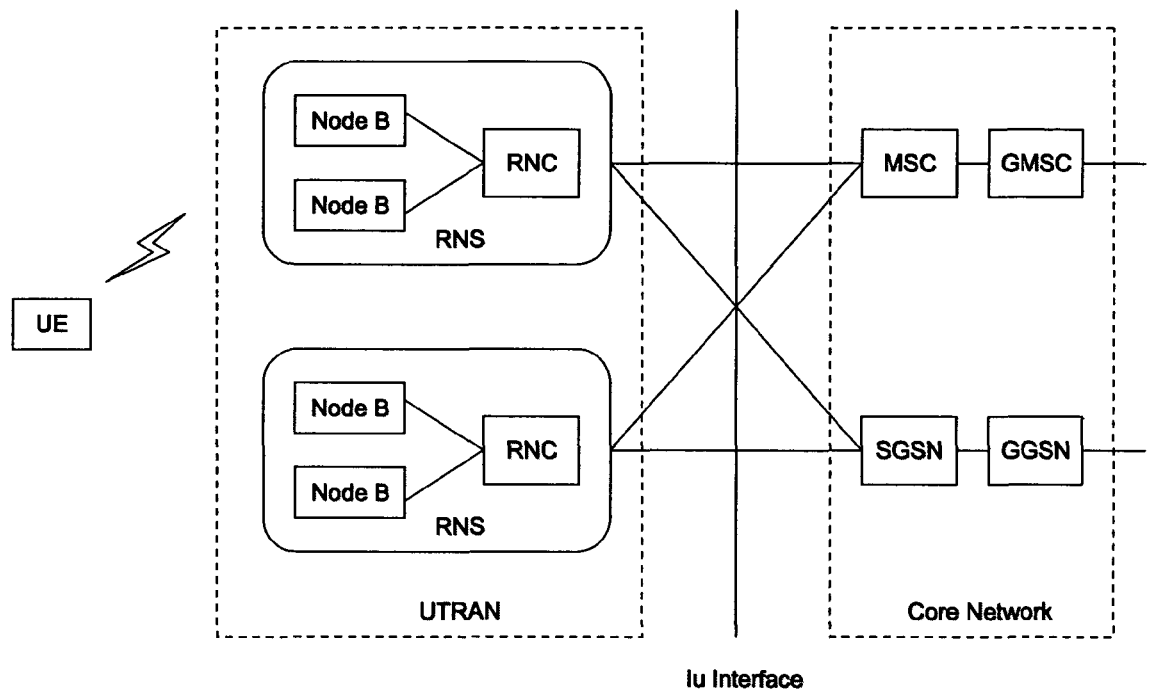
FIG. 1 illustrates a network structure of general UMTS system.
Figure 2:
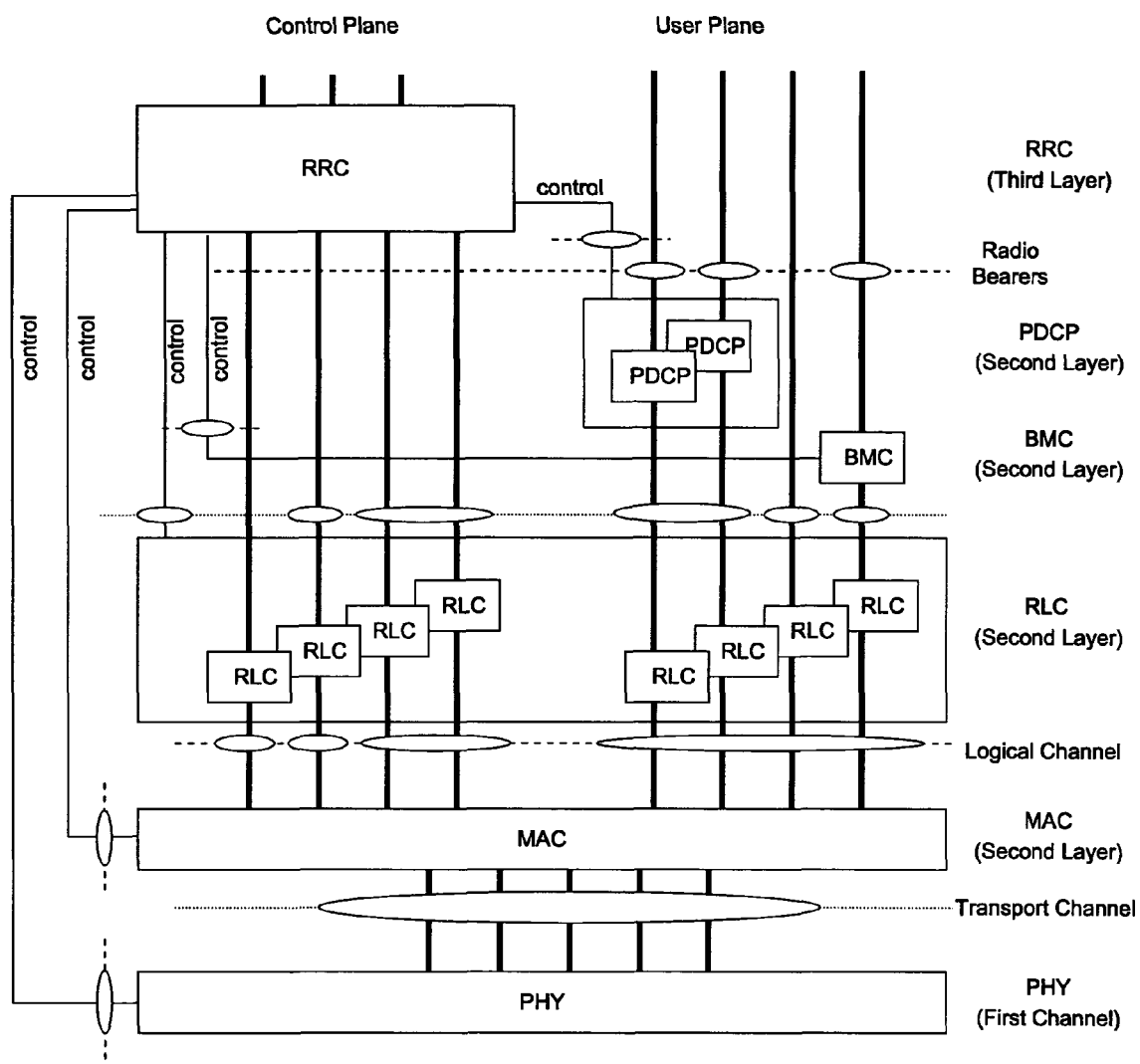
FIG. 2 illustrates a structure of a radio access interface protocol between a terminal and UTRAN on the basis of 3GPP radio access network standards.

Reference will now be made in detail to embodiments of the present invention, examples of which are illustrated in the accompanying drawings. Wherever possible, the same reference numbers will be used throughout the drawings to refer to the same or like parts.

The present invention is implemented in a mobile communication system such as UMTS (Universal Mobile Telecommunications System) developed by 3GPP. Without being restricted thereto, the present invention can be also applied to a communication system operated in different standards.

The present invention proposes a control signal transmission method for transmitting MBMS service data in a wireless system providing various types of MBMS services. For this purpose, the present invention proposes a method for transmitting system information and MBMS control information through different logical channels. That is, the system information is transmitted through a BCCH, while MBMS control information is transmitted through an MCCH.

The present invention defines construction of MBMS control information transmitted through the MCCH. That is, in the present invention, there are constructed an MBMS scheduling block (MSB) consisting of an MBMS service identifier list and scheduling information of plural MBMS RB configuration (setup) information, and an MBMS service information block (MSIB) consisting of one MBMS service identifier and MBMS RB setup information for a corresponding service.

The present invention proposes a method where a terminal group receives an MSIB at a certain time indicated by the MSB, sets an MBMS RB by using MBMS RB setup information of the received MBIB, and receives MBMS service data through the MBMS RB.

In the present invention, the MSB and the MSIB are repeatedly and continuously transmitted to a terminal group. A wireless system (UTRAN) constructs the MSB and the MSIB and then repeatedly and continuously transmits the MSB and the MSIB which have the same information. The wireless system may substitute partial or entire information included in the MSB and the MSIB with new information.

The MSB includes block update information that every MSIB has in order to inform a terminal group that a certain MSIB has been updated with new information.

In addition, in order for the MSB to inform about the update with the new information, the MSB includes block update information for itself. Accordingly, the MSB also includes update information for each block together with an MBMS service identifier list and scheduling information of MBMS RB setup information. The block update information has a positive integer value. When an initial block is formed, block update information is set as an initial value, and when information of a specific block is updated, corresponding block update information increases to a value obtained by adding 1 to the initial value. Accordingly, whenever information of a specific block is updated, the corresponding block update information increases to a value obtained by adding 1 to a previous value.

In a state that an increased value of block update information is identical to a limit value previously set in the wireless system, if information of a specific block is updated, the corresponding block update information is set as an initial value. Therefore, the value of the block update information increases one by one whenever the corresponding block is updated, continuously circulating between the initial value and the limit value.

Construction of system information for MBMS and MBMS control information

In the present invention, control information for providing an MBMS service, including an MBMS service identifier list and an MBMS service identifier for transmitting MBMS service data, MBMS radio bearer setup information for each MBMS service, block update information, and scheduling information of MBMS RB setup information, is called MBMS control information. That is, the MBMS control information includes an MBMS scheduling block (MSB) and an MBMS service information block (MSIB).

The MBMS RB setup information includes an activation time when each MBMS RB is activated, setup information of channels (logical channel, transport channel and physical channel) constituting each MBMS RB and setup information of layers (PDCP layer, RLC layer, MAC layer and physical layer). The MBMS RB setup information exists for each MBMS RB. Transmission scheduling information of the MBMS RB setup information provides time information indicating when one or more MBMS RB setup information provided from one cell is respectively transmitted to the physical channel. For example, when each MBMS RB setup information is transmitted wirelessly through the physical channel, the scheduling information informs of a system frame number (SFN) value.

Figure 3:
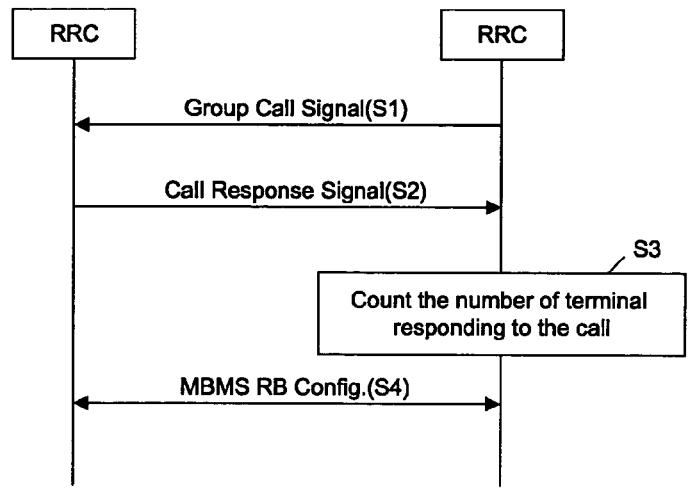
FIG. 3 illustrates a process that UTRAN determines a type of an MBMS radio bearer (RB)
Figure 4:
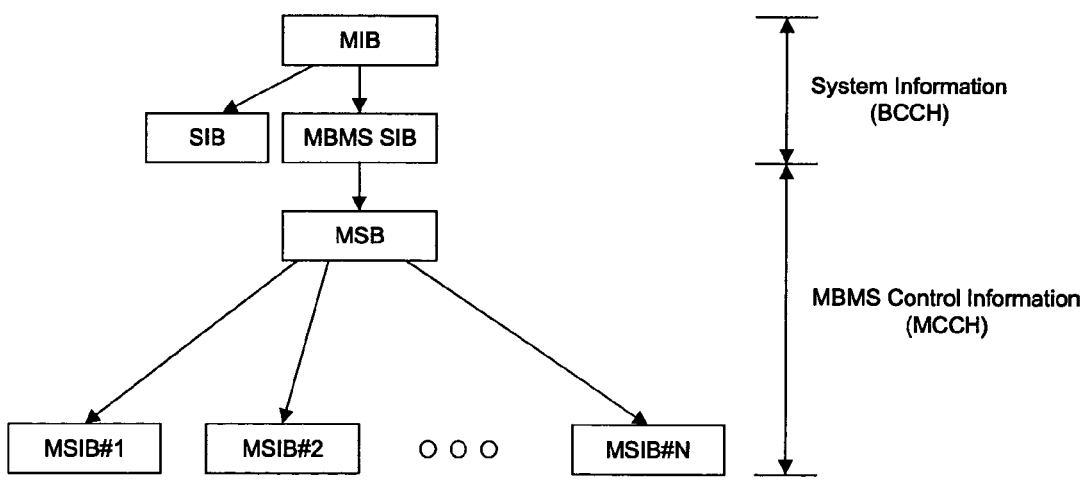
FIG. 4 illustrates a layer structure of MBMS control information for one cell.

FIG. 3 illustrates a layer structure of the system information and the MBMS control information for one cell.

As shown in FIG. 3, the system information is transmitted through a BCCH, while the MBMS control information is transmitted through an MCCH.

The control information is roughly divided into an MBMS scheduling block (MSB) and an MBMS service information block (MSIB).

The MSIB transmits service-specified information (MTCH setup information and bearer information), and one block transmits one service. The MSIB provides information related one MBMS service provided to a corresponding cell. The MSIB includes an MBMS service identifier and MBMS RB setup information for a corresponding service. The MSIBs exist as many as MBMS services provided in a corresponding cell.

The MSB includes an MBMS service identifier list provided in a corresponding cell, transmission scheduling information of each MSIB, and block update information for each MSIB. The transmission scheduling information of the MSIB indicates certain time when one MSIB is transmitted through the physical channel, which is usually indicated by an SFN value.

The system information corresponding to an upper position of the MBMS control information includes a master information block (MIB), one or more system information block (SIB) and an MBMS SIB. The SIB includes substantial system information, and scheduling information for transmission of the SIB is carried on the master information block (MIB).

The MBMS SIB is an SIB transmitting MBMS-related information, that is, MCCH setup information, while the MIB transmits scheduling information on the MBMS SIB. For example, the MBMS SIB can exist separately from the conventional SIBs. In this case, the MIB should include scheduling information on a new SIB (MBMS SIB). For another example, the MBMS SIB may be constructed by adding MCCH setup information to one of the conventional SIBs. In this case, because one of the conventional SIBs is used, there is no new information added to the MIB and SB.

In a different embodiment, the MSB may be included in the MBMS SIB. In this case, as for the MSB, an MBMS service identifier list provided in a corresponding cell, transmission scheduling information of each MSIB and block update information for each MSIB are transmitted through the BCCH.

In the present invention, the MBMS control information and the system information are transmitted through different logical channels. That is, the system information is transmitted through the BCCH (Broadcast Control Channel), while the MBMS control information is transmitted through the MBMS control channel (MCCH).

Figure 5A:
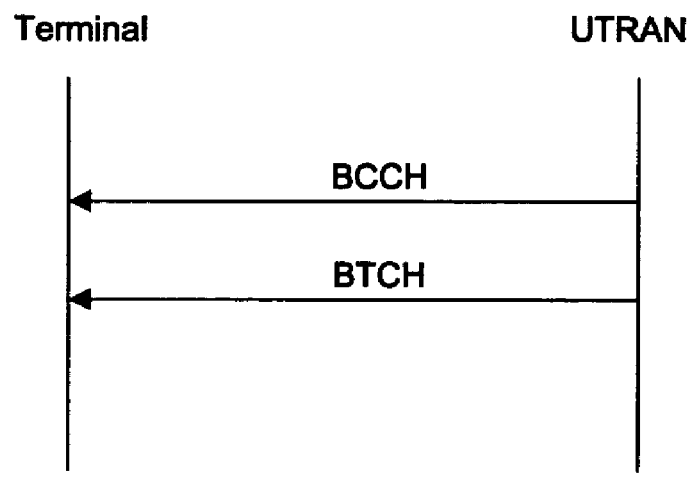
FIG. 5A illustrates that MBMS control information and system information are transmitted through one logical channel (BCCH) in accordance with a conventional art.

In detail, as shown in FIG. 5A, in the conventional UTRAN, the MBMS control information and system information are transmitted to a terminal through the BCCH, and the terminal receives data through a CTCH after obtaining setup information (bearer information) of the CTCH from the BCCH. Thus, in the conventional art, construction of the MBMS-related control information transmitted through the MCCH is not defined.

Figure 5B:
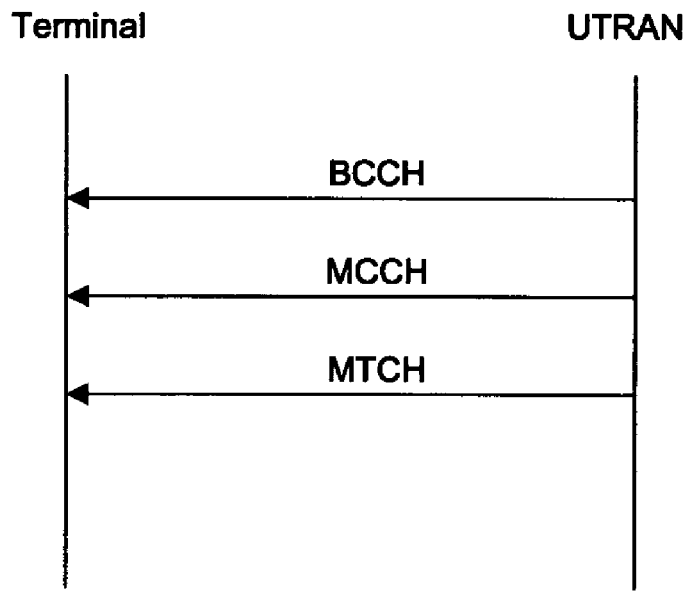
FIG. 5B illustrates that MBMS control information and system information are transmitted through different logical channels (BCCH and MCCH) in accordance with the present invention.

Comparatively, as shown in FIG. 5B, in the present invention, the UTRAN transmits setup information of the MCCH through the BCCH, and transmits setup information (bearer information) of the MTCH to the terminal through the MCCH. The terminal obtains the setup information of the MTCH from the MCCH, and then receives the MBMS data through the MTCH.

The MCCH transmits data including one MSB and one or more MSIBs to the terminal group. The terminal group first obtains system information and an MSB through the BCCH and the MCCH, and then, receives an MSIB including bearer information, that is, the MTCH setup information, on a specific service.

The terminal group receiving the specific MBMS service receives the MCCH only for a time interval during which a corresponding MSIB is transmitted by using the scheduling information of MSIBs included in the MSB.

Accordingly, the terminal belonging to the terminal group can receive a channel other than the MCCH for some other time than the time section indicated by the scheduling information of the MSIB. For example, the terminal, which can not simultaneously receive plural channels, may receive a channel such as a paging channel (PCH), a broadcast channel (BCH) or dedicated control channel (DCCH), a common control channel (CCCH), a dedicated traffic channel (DTCH), a common traffic channel (DTCH) or an MTCH (MBMS Traffic Channel). In addition, the terminal may temporarily stop receiving of every channel for some other time than the time section indicated by the scheduling information of the MSIB, performing a discontinuous reception (DRX).

The MBMS SIB, MSB and MSIB are repeatedly and continuously transmitted. Whether the MBMS SIB, the MSB and MSIB have been updated can be known through the block update information, and the MSB has block update information on itself.

Accordingly, when the terminal first receives the MSB, it stores block update information for the MSB. Thereafter, the terminal always obtains block update information of the MSB first, and compares the value of the obtained block update information with a previously stored value.

If the two values are identical, the terminal judges that information of the corresponding MSB has not been updated. If, however, the two values are different, the terminal judges that information of the corresponding MBS has been updated, and checks whether scheduling information of the MSIB included in the MSB has been updated.

The MSB has block update information on every MSIB of one cell. Thus, if the terminal first receives the MSB, or if the terminal judges that the information of the MSB has been updated through the above process, it may obtain block update information on the corresponding MSIB.

When the terminal first obtains the block update information on the corresponding MSIB, it stores the corresponding block update information. And then, when the terminal newly obtains block update information later, it compares the newly obtained value with the previously stored value. If the two values are identical, the terminal judges that the information of the corresponding MSIB has not been updated and does not receive the corresponding MSIB. If, however, the two values are different, the terminal judges that the information of the corresponding MSIB has been updated, and receives the corresponding MSIB.

In the follow-up process, the lower layer includes the PDCP, the RLC, the MAC and the physical layer, the lower layers of the RRC. The dotted line in the drawing indicates that a process that may be performed or not according to conditions.

Setting up MBMS RB for MBMS service

FIG. 6 shows a method for setting up an MBMS RB by transmitting and receiving MBMS control information when a cell intends to first provide a specific MBMS service. In FIG. 6, the arrow indicated by a dotted line denotes a step that may not be performed, and the lower layer signifies the L1/L2 layer of the terminal or UTRAN.

The method for setting up MBMS RB is favorably used for setting up the point-to-multipoint MBMS RB. UTRAN recognizes the number of terminals that desire to receive a specific MBMS service in a cell, and sets a point-to-multipoint or a point-to-point MBMS RB for a corresponding MBMS service depending on whether the number of terminals is greater than or smaller than a specific threshold value.

As shown in FIG. 6, in order to provide the specific MBMS service to a specific cell, UTRAN RRC performs the above-described operation and determines whether to set up the MBMS RB for transmitting user data of the specific MBMS service (step S10).

In this case, one of the following three processes is performed depending on whether the MBMS control channel (MCCH) has been set or not.

If the MCCH has not been set in the corresponding cell, the UTRAN RRC transmits MCCH setup information to the lower layer (L1/L2) to set up an MCCH (step S11).

In this respect, there may already be an MCCH in the corresponding cell if there is an MBMS RB in the cell in order to provide some other MBMS service. Therefore, in the case that the MCCH has been already set up in the cell and a setup condition of the MCCH is desired to be corrected, the UTRAN RRC transmits MCCH reset information to the lower layer (L1/L2) to re-setup the MCCH (step S11).

Finally, if an MCCH has been already set up in the corresponding cell but no re-setup is required, the UTRAN RRC does not perform the MCCH setup/re-setup process.

The UTRAN RRC transmits MBMS RB setup information for providing the corresponding MBMS service to the lower layer to set up an MBMS RB in UTRAN (step S12).

The UTRAN RRC constructs an MBMS SIB including the setup information of the MCCH channel provided in the corresponding cell, and transmits an MIB including scheduling information of the MBMS SIB to the terminal through the BCCH (step S13). At this time, the UTRAN RRC performs the following operation depending on whether the MIB includes the scheduling information of the MBMS SIB.

That is, if the MIB can not include the scheduling information of the MBMS SIB in the step of S13, the scheduling information of the MBMS SIB would be transmitted through an SB (step S14). Then, the terminal receives the SB from UTRAN, and at this time, the scheduling information of the SB is included in the previously received MIB. Accordingly, the terminal obtains the scheduling information of the SB from the previously received MIB and receives the corresponding SB.

If, however, the MIB includes the scheduling information of the MBMS SIB in the step of S13, the terminal does not receive the SB.

After the step S13 or S14 is completed, the UTRAN RRC transmits the MBMS SIB to the terminal group of the corresponding cell through the BCCH (step S15). Then, the terminal receives the MBMS SIB by using the scheduling information of the MBMS SIB included in the MIB or SB.

After receiving the MBMS SIB, the RRC of the terminal belonging to the terminal group transmits the MCCH setup information included in the MBMS SIB to the lower layer to set up the MCCH in the terminal (step S16).

Thereafter, the UTRAN RRC constructs one MSIB for the corresponding MBMS service and then constructs scheduling information of the MSIB. The UTRAN RRC transmits the MSB including the MSIB scheduling information to a specific terminal group through the MCCH (step S17), and the terminal RRC obtains the scheduling information of a specific MSIB from the received MSB and then receives a specific MSIB according to the corresponding scheduling information (step S18). At this time, the terminal group does not receive unnecessary MSIB. That is, the terminal group receiving the specific MBMS service does not receive other MSIB than the specific MSIB for the corresponding MBMS service.

The terminal RRC belonging to the terminal group obtains MBMS RB (MTCH or DTCH) setup information for the specific MBMS service from the received MSIB, and transmits the obtained setup information to the lower layer to set up the MBMS RB (step S19).

If data is received from an upper layer of the user plane after an activation time included in the MBMS RB setup information of the received MSIB, the UTRAN lower layer transmits user data of the corresponding MBMS service to the specific terminal group through the MBMS RB (step S20). At this time, in case of the point-to-multipoint (PTM) MBMS RB, the logical channel (MTCH) is used for the data transmission, while in case of the point-to-point (PTP) MBMS RB, the logical channel (DTCH) is used for data transmission. The lower layer of the terminal belonging to the corresponding terminal group receives the user data transmitted from the MBMS RB after the activation time included in the MBMS RB setup information, and the received data is transmitted to the upper layer of the user plane of the lower layer of the terminal.

First Embodiment of Re-Setting MBMS RB

In general, the existing MBMS RB can be re-set due to change in a service transfer rate and a packet size. In the present invention, the process of re-setting a certain MBMS RB for a specific MBMS service to an MBMS RB with a new setup value. This process is favorably performed for re-setting a point-to-multipoint MBMS RB to a point-to-multipoint MBMS RB.

FIG. 7 illustrates the first embodiment of the resetting the MBMS RB, in which the setup of MCCH is not changed in the process of resetting a specific MBMS RB. If the previous setup of the MCCH is changed according to the resetting of the MBMS, the terminal and UTRAN perform the same process as that of FIG. 6, and in this case, the process of setup of the MCCH and the MBMS RB is replaced with the resetting the MCCH and the MBMS RB.

As shown in FIG. 7, when a change in a transfer rate and packet size of an MBMS service is detected, the UTRAN RRC first determines re-setup of the MBMS RB (step S21). At this time, the UTRAN RRC can temporarily stop data transmission in order to prevent a data loss.

The UTRAN RRC transmits re-setup information of the MBMS RB to the lower layer, to re-set up an MBMS RB in UTRAN (step S22). And then, the UTRAN RRC substitutes the existing MBMS RB setup information of the MSIB on the corresponding MBMS service with the MBMS RB re-setup information. After constructing scheduling information of the MSIB, the UTRAN RRC transmits an MSB including MSIB scheduling information to the terminal group (step S23).

The terminal first receives the MSB to detect whether the MSB has been updated. If the MSB has been updated, the terminal compares the value of block update information on the corresponding MSIB with a previously stored value. If the two values are different, the terminal obtains scheduling information of the corresponding MSIB.

The UTRAN RRC transmits the MSIB according to the scheduling information of the MSIB (step S24). The terminal receives the specific MSIB according to the previously obtained scheduling information. At this time, the terminal group does not receive any unnecessary MSIB. That is, a terminal group which receives a specific MBMS service does not receive any other MSIB than the specific MSIB for the corresponding MBMS service.

The RRC of the terminal belonging to the terminal obtains the MBMS RB re-setup information for the specific MBMS service from the received MSIB, and transmits the obtained re-setup information to the lower layer to re-set up the MBMS RB (step S25).

After an activation time included in the MBMS RB re-setup information of the received MSIB, if the UTRAN lower layer receives data from the upper layer of the user plane or resumes data transmission which has been temporarily suspended, it transmits the user data of the corresponding MBMS service to a specific terminal group through the MBMS RB. At this time, in case of the point-to-multipoint MBMS RB, the logical channel (MTCH) is used, whereas in case of the point-to-multipoint MBMS RB, the DTCH is used for data transmission. The lower layer of the terminal belonging to the corresponding terminal group receives the user data from the MBMS RB after the activation time included in the MBMS RB setup information (step S26), and the received data is transmitted to the upper layer of the user plane.

In general, when a terminal is moved into a new cell, an MBMS RB of the new cell should be set up in order to receive a specific MBMS service that the terminal has received in the previous cell. In addition, in a state that the specific MBMS service is already provided in a cell, if a new terminal joins a terminal group to receive data, the MBMS RB should be set up.

The process that, after a setup of an MBMS RB, a new terminal sets the previously set MBMS RB therein to receive data of an MBMS service, will now be described.

Figure 8:
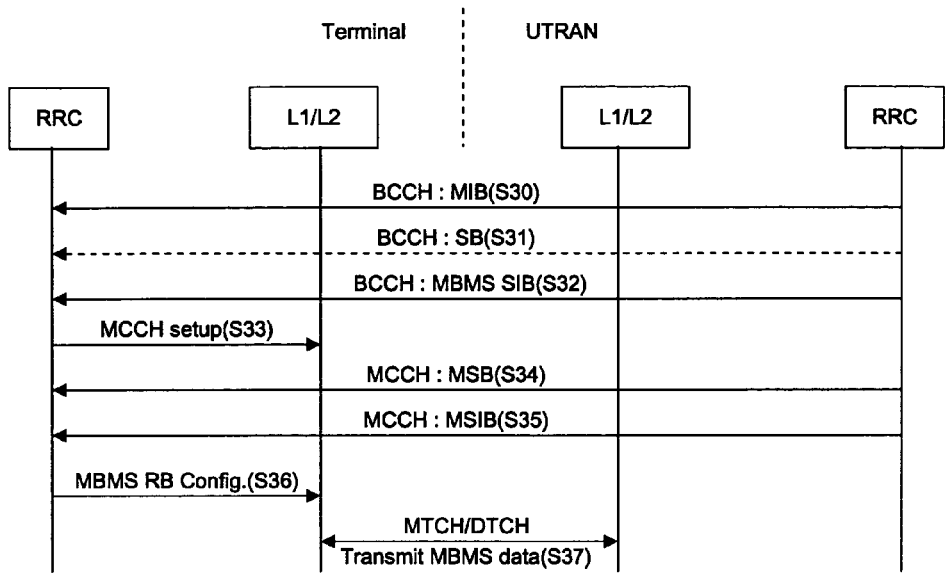
FIG. 8 illustrates a process that a new terminal sets up an MBMS RB.

FIG. 8 shows a process that a new terminal sets up an MBMS RB.

The process of FIG. 8 is the same as the steps S13~S20 of FIG. 6. That is, the new terminal first receives an MIB or an SB of a corresponding cell through the BCCH to obtain an MBMS SIB, and sets up an MCCH therein (steps S30-S33). In addition, the new terminal receives an MSB transmitted through the MCCH to obtain an MSIB for the MBMS service desired to be received by a user, and sets up an MBMS RB therein (steps S34-S36).

The terminal receives the MBMS data from the MBMS RB (MTCH or DTCH) after an activation time included in the MBMS RB setup information of the MSIB (step S37), and transmits it to the upper layer of the user plane of the lower layer. At this time, in case of the point-to-multipoint MBMS RB, the logical channel (MTCH) is used for data transmission, while incase of the point-to-point MBMS RB, the DTCH is used. There is a possibility that the MBMS RB of UTRAN is already transmitting a data. In this case, the activation time may not be included in the MBMS RB setup information. If the activation time is not included in the MBMS RB setup information, the terminal receives the MBMS RB immediately after the MBMS RB is set up.

Second Embodiment of Re-Setup of MBMS RB: Re-Setup from Point-to-Multipoint MBMS RB to Point-To-Point MBMS RB The present invention proposes a method for re-setting up a point-to-multipoint MBMS RB for a specific MBMS service to a point-to-point MBMS RB with a new setup value. For this purpose, in the present invention, MBMS-related control information, that is, MBMS RB re-setup information, is transmitted to a terminal, for which a common channel has been set, through a current MBMS common control channel (MCCH), not the DCCH.

The general re-setup process of the MBMS RB with respect to FIG. 7 (the first embodiment of the re-setup of MBMS RB) can be used for re-setting up from the point-to-multipoint MBMS RB to the point-to-point MBMS RB, but the re-setup process of FIG. 7 is favorable for re-setting up again the point-to-multipoint MBMS RB to the point-to-multipoint MBMS RB.

The second embodiment of the re-setup of the MBMS RB is different from the first embodiment of the re-setup of the MBMS RB, in the aspect that the point-to-point MBMS RB is set up by using the radio bearer (RB) setup or radio bearer re-setup process. The RB setup/re-setup requires a response of the terminal, so that a point-to-point RB can be reliability released.

In the second embodiment of the re-setup of the MBMS RB includes two cases depending on whether UTRAN recognizes existence of a specific terminal in a cell.

Figure 9:
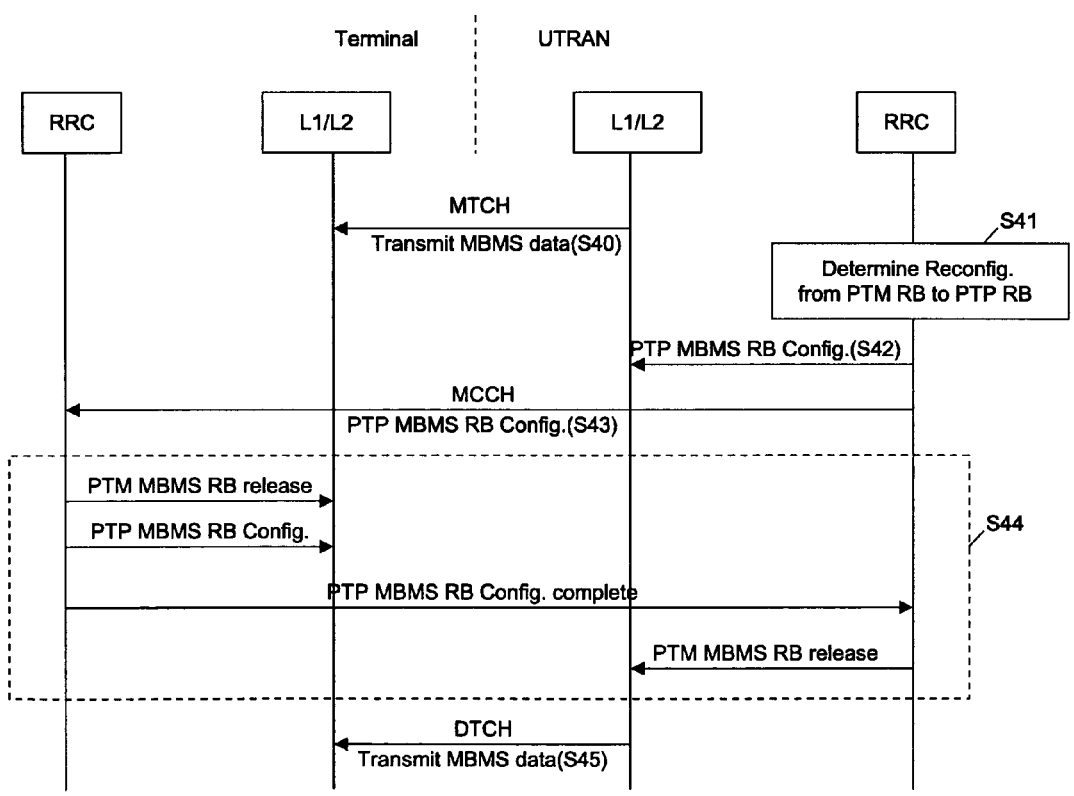
FIG. 9 illustrates a second embodiment of resetting an MBMS RB in which when UTRAN recognizes existence of a specific terminal in a corresponding cell, an MBMS RB is reset from a point-to-multipoint to a point-to-point.

FIG. 9 illustrates a process of re-setup of MBMS RB from a point-to-multipoint to a point-to-point in case that UTRAN recognizes an existence of a terminal in a cell.

As shown in FIG. 9, UTRAN transmits MBMS data through a point-to-multipoint MBMS RB (step S40). At this time, the logical channel MTCH is used for the data transmission and reception.

UTRAN RRC recognizes the number of users who receive the specific MBMS service in a corresponding cell and determines re-setup of the MBMS RB (step S41). For example, UTRAN RRC detects a cell movement of a specific terminal through a cell update procedure. At this time, the UTRAN RRC calculates the number of users who are receiving the specific MBMS service in the cell. If the number of users is smaller than a specific threshold value, the UTRAN RRC determines to re-setup the MBMS RB from the point-to-multipoint to the point-to-point. In order to re-setup the MBMS RB, UTRAN can temporarily stop data transmission of the corresponding MBMS service.

UTRAN RRC transmits the point-to-point MBMS RB setup information to the lower layer to set up the point-to-point MBMS RB in UTRAN (step S42). Because the point-to-point MBMS RB is a dedicated channel for a specific terminal, its information may differ for every terminal. Thus, the point-to-point MBMS RBs for specific MBMS services are provided as many as terminals belonging to a specific terminal group receiving the service. For this reason, UTRAN should transmit the MBMS RB setup information as many as the point-to-point MBMS RBs to the lower layer of UTRAN.

The UTRAN RRC transmits the point-to-point MBMS RB setup information to every RRC of terminals belonging to the specific terminal group through the MCCH (step S43). At this time, the point-to-point MBMS RB setup information is inserted in an RRC RB setup message and transmitted to each terminal. Accordingly, the terminal RRC reconstructs the MBMS RB from the point-to-multipoint to the point-to-point on the basis of the received point-to-point MBMS RB setup information (step S44).

That is, when the RRC RB setup message is received, the RRC of the terminal belonging to the terminal group commands the lower layer of the terminal to release the point-to-multipoint MBMS RB in order to release the point-to-multipoint MBMS RB for receiving the MBMS service, and transmits the received point-to-point MBMS RB setup information to the lower layer of the terminal to set up the point-to-point MBMS RB.

After the setup of the lower layer is completed, the terminal RRC inserts a point-to-point MBMS RB setup completion information into an RRC RB setup completion message and transmits it to the UTRAN RRC. Upon receiving the RRC RB setup completion message, the UTRAN RRC commands the lower layer of UTRAN to release the point-to-multipoint MBMS RB.

Then, the L1/L2 of UTRAN resumes data transmission of the MBMS service through the new point-to-point MBMS RB including the logical channel (DTCH) (step S45).

Figure 10:
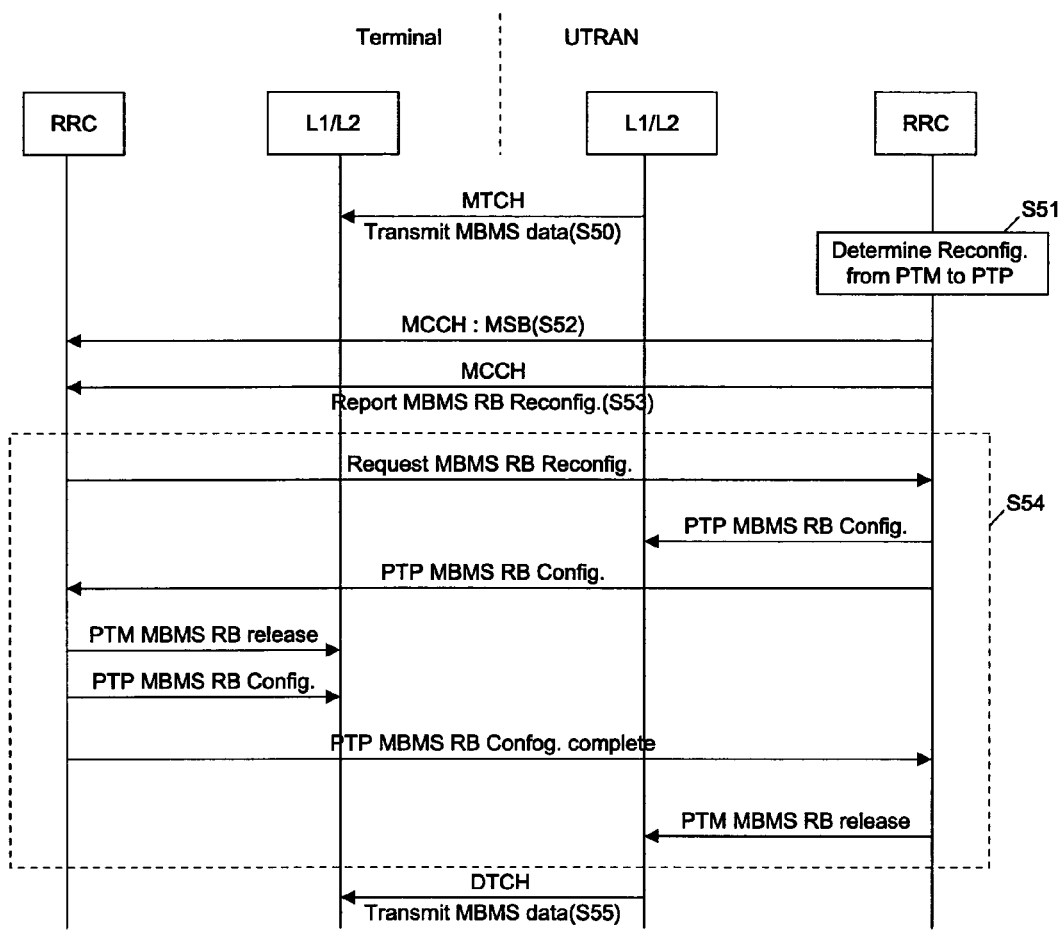
FIG. 10 illustrates a second embodiment of resetting an MBMS RB in which when UTRAN does not recognize existence of a specific terminal in a corresponding cell, an MBMS RB is reset from a point-to-multipoint to a point-to-point.

FIG. 10 illustrates a process of re-setup of MBMS RB from point-to-multipoint to point-to-point if UTRAN does not recognize existence of a terminal in a cell.

As shown in FIG. 10, a terminal is currently receiving MBMS data through the point-to-multipoint MBMS RB (step S50). At this time, the logical channel MTCH is used for data transmission and reception.

The UTRAN RRC detects a cell movement of a terminal through a cell update procedure, and calculates the number of users who are receiving a specific MBMS service in the corresponding cell. If the calculated number of users is smaller than a specific threshold value, the UTRAN RRC determines re-setup of the MBMS RB from point-to-multipoint to point-to-point (step S51).

The UTRAN RRC substitutes existing MBMS RB setup information of an MSIB for the corresponding MBMS service with the MBMS RB re-setup information. The UTRAN RRC constructs scheduling information of the MSIB, and then transmits an MSB including the MSIB scheduling information to a specific terminal group through the MCCH (step S52).

The terminal receives the MSB and checks whether the MSB has been updated. If the MSB has been updated, the terminal compares a value of block update information on the corresponding MSIB with a previously stored value.

If the two values are different, the terminal obtains scheduling information of the corresponding MSIB. The UTRAN RRC adds a point-to-multipoint MBMS RB re-setup notification message in the MSIB for the MBMS service and transmits it to the terminal group (step S53).

Accordingly, the terminal RRC reconstructs the MBMS RB from point-to-multipoint to point-to-point on the basis of the received point-to-multipoint MBMS RB re-setup notification (step S54).

In other words, the terminal RRC receives the MSIB for the corresponding MBMS service by using the scheduling information and obtains the point-to-multipoint MBMS RB setup notification message. The message informs that terminals of the corresponding terminal group should re-set up the MBMS RB from the point-to-point to point-to-multipoint.

When the point-to-multipoint MBMS RB setup notification message is obtained, the RRCs of the terminals belonging to the terminal group respectively transmit an MBMS RB re-setup request message to the UTRAN RRC. The message includes terminal identifier information of corresponding terminals.

The UTRAN RRC transmits the point-to-point MBMS RB setup information to the lower layer of UTRAN, to set up the point-to-point MBMS RB in UTRAN. Because the point-to-point MBMS RB is a dedicated channel for a specific channel, UTRAN transmits MBMS RB setup information as many as the point-to-point MBMS RBs to the lower layer of UTRAN.

In addition, the UTRAN RRC transmits the point-to-point MBMS RB setup information to every RRC of terminals belonging to the specific terminal group in the cell. At this time, the point-to-point MBMS RB setup information is inserted in the RRC RB message and transmitted to each terminal.

Upon receiving the RRC RB setup message, the RRC of the terminal belonging to the terminal group commands the lower layer of the terminal to release the point-to-multipoint MBMS RB in order to release the point-to-multipoint MBMS RB for receiving the MBMS service, and transmits the received point-to-point MBMS RB setup information to the lower layer of the terminal in order to set up the point-to-point MBMS RB.

After the setup of the lower layer is completed, the terminal RRC inserts point-to-point MBMS RB setup completion information into an RRC RB setup completion message and transmits it to the UTRAN RRC. Upon receiving the RRC RB setup completion message, the UTRAN RRC commands the lower of UTRAN to release the point-to-multipoint MBMS RB.

Accordingly, UTRAN resumes data transmission of the MBMS service through the new point-to-point MBMS RB including the logical channel (DTCH) (step S55).

A Third Embodiment of Re-Setup of MBMS RB: Re-Setup from Point-To-Point MBMS RB to Point-To-Multipoint MBMS RB The present invention proposes a method for re-setting up a certain point-to-point MBMS RB for a specific MBMS service to a point-to-multipoint MBMS RB having a new setup value. For this purpose, in the present invention, MBMS-related control information, that is, MBMS RB re-setup information, is transmitted to a terminal, for which a dedicated channel has been set, through a current dedicated control channel (DCCH), not the MCCH.

The general re-setup process of the MBMS RB with respect to FIG. 8 (the first embodiment of the re-setup of MBMS RB) can be used for re-setting up from the point-to-multipoint MBMS RB to the point-to-point MBMS RB, but the re-setup process of FIG. 7 is favorable for re-setting up again the point-to-multipoint MBMS RB to the point-to-multipoint MBMS RB.

In the third embodiment of re-setup of MBMS RB, a point-to-point MBMS RB is released by using the same process of RB setup or RB re-setup as in the second embodiment. The reason is that the RB setup/re-setup requires a terminal's response, a point-to-point RB can be released reliably.

The third embodiment of the re-setup of MBMS RB includes two cases depending on whether a terminal can simultaneously receive the DTCH and the MCCH.

Figure 11:
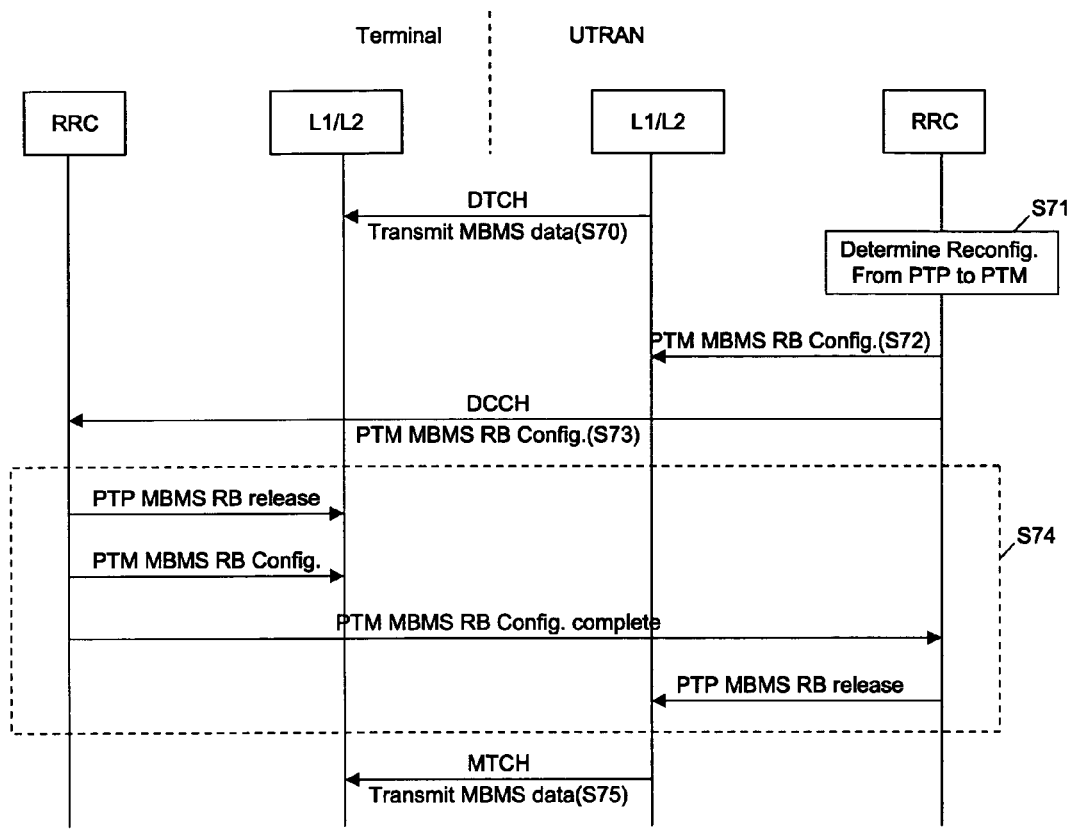
FIG. 11 illustrates a method for transmitting new point-to-multipoint MBMS RB setup information through the DTCH because a terminal is not able to receive the DTCH and the MCCH simultaneously.

FIG. 11 illustrates a method for transmitting new point-to-multipoint MBMS RB setup information through the DTCH because a terminal is not able to receive the DTCH and the MCCH simultaneously.

As shown in FIG. 11, UTRAN transmits MBMS data through the point-to-point MBMS RB (step S70). At this time, the logical channel DTCH is used for data transmission and reception.

The UTRAN RRC detects a cell movement of a specific terminal through a cell update procedure, and calculates the number of users who are receiving a specific MBMS service in a corresponding cell. If the number of users is smaller than a specific threshold value, the UTRAN RRC determines re-setup of MBMS RB from the point-to-multipoint to point-to-point (step S71). At this time, UTRAN may temporarily stop data transmission of the corresponding MBMS service in order to re-set up the MBMS RB.

The UTRAN RRC sets up the point-to-multipoint MBMS RB at the lower layer (L1/L2) of UTRAN (step S72), and transmits the point-to-multipoint MBMS RB setup information to every RRC of terminals belonging to a specific terminal group in the cell (step S73). At this time, point-to-multipoint MBMS RB setup information is inserted into an RRC RB setup message and transmitted to each terminal. The point-to-multipoint MBMS RB setup information is the same to every terminals belonging to the specific terminal group.

Then, the terminal RRC reconstructs the MBMS RB from the point-to-point to the point-to-multipoint on the basis of the received point-to-multipoint MBMS RB setup information (step S74).

That is, when the point-to-multipoint MBMS RB setup information is received, the RRCs of terminals belonging to the terminal group command the lower layer to release the point-to-point MBMS RB in order to release the point-to-point MBMS RB, and transmit the received point-to-multipoint MBMS RB setup information to the lower layer of the terminal in order to set up the point-to-multipoint MBMS RB.

After the setup of the lower layer is completed, the terminal RRC inserts a point-to-multipoint MBMS RB setup completion information into an RRC RB setup completion message and transmits it to the UTRAN RRC. Upon receiving the RRC RB setup completion message, the UTRAN RRC commands the lower layer of UTRAN to release the point-to-point MBMS RB. At this time, the point-to-point MBMS RB is a dedicated channel for a specific terminal, the UTRAN RRC should transmit the MBMS RB release command as many as the point-to-point MBMS RBs to the lower layer of UTRAN.

Accordingly, the UTRAN RRC resumes of data transmission of the MBMS service through the new point-to-point MBMS RB including the logical channel (DTCH) (step S75).

Figure 12:
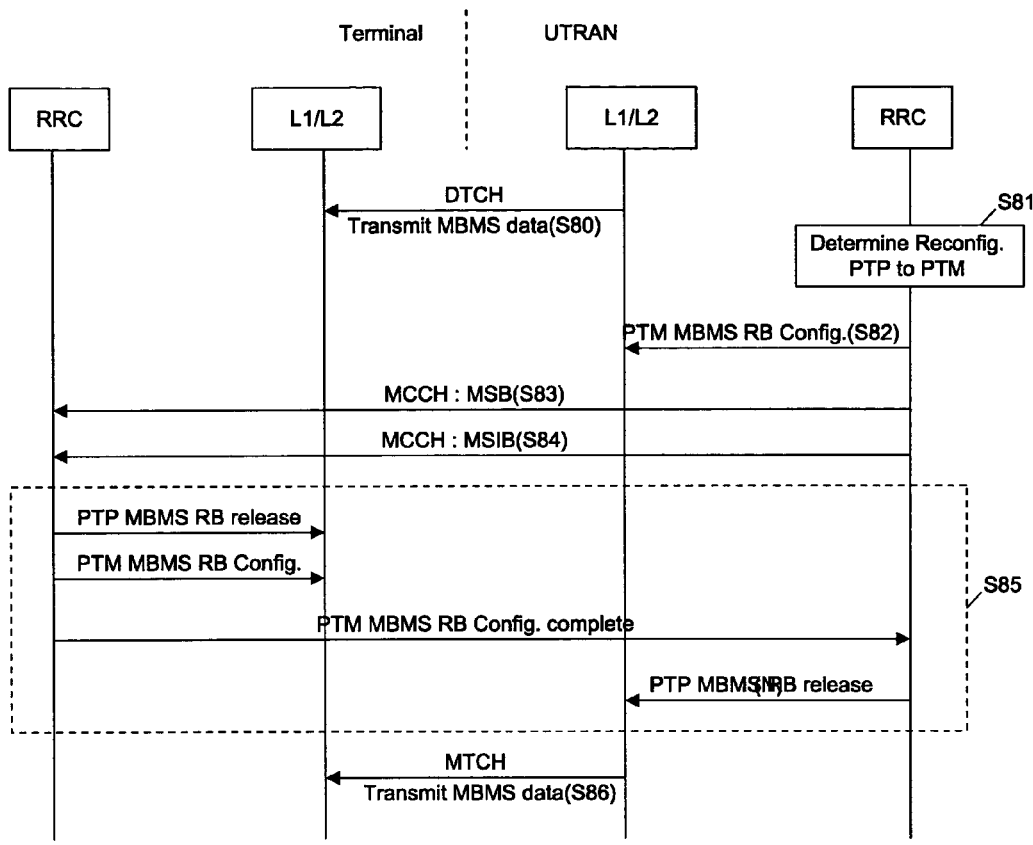
FIG. 12 illustrates a method for receiving new point-to-multipoint MBMS RB setup information through an MCCH if a terminal can simultaneously receive a DTCH and the MCCH.

FIG. 12 illustrates a method for receiving new point-to-multipoint MBMS RB setup information through the MCCH if the terminal is able to simultaneously receive the DTCH and the MCCH. In this process, it is assumed that the MCCH has been already set for UTRAN and the terminal.

As shown in FIG. 12, a terminal is receiving data through the point-to-point MBMS RB (step S80), and the logical channel DTCH is used for the data transmission and reception.

The UTRAN RRC detects a cell movement of a specific terminal through the cell update procedure, and calculates the number of users who are receiving a specific MBMS service in a cell. If the number of users is smaller than a specific threshold value, the UTRAN RRC determines re-setup of MBMS RB from the point-to-multipoint to point-to-point (step S81). At this time, UTRAN may temporarily stop data transmission of a corresponding MBMS service to re-set up the MBMS RB.

The UTRAN RRC transmits the point-to-multipoint MBMS RB setup information to the lower layer (L1/L2) of UTRAN, to set up the point-to-multipoint MBMS RB in UTRAN (step S82). In addition, the UTRAN RRC transmits MBMS control information, that is, an MSB and an MSIN, through the MCCH (steps S83 and S84).

The terminal first receives the MSB and checks whether the MSB has been updated. If the MSB has been updated, the terminal compares a value of block update information on the corresponding MSIB with a previously stored value. If the two values are different, the terminal obtains scheduling information of the corresponding MSIB.

After obtaining the scheduling information of the specific MSBI from the received MSB, the terminal receives a specific MSIB according to the scheduling information. At this time, the terminal group does not receive unnecessary MSIB. That is, a terminal group receiving a specific MBMS service does not receive any other MSIB than the specific MSBI for the corresponding MBMS service.

Then, the terminal RRC reconstructs the MBMS RB from the point-to-point to point-to-multipoint by using the update information of the received MSB and the scheduling information of the MSIB (step S85).

In other words, the RRC of the terminal belonging to the terminal group obtains MBMS RB setup information for the specific MBMS service form the received MSIB and commends the lower layer to release the point-to-point MBMS RB in order to release the point-to-point MBMS RB, and transmits the obtained point-to-multipoint MBMS RB setup information to the lower layer of the terminal in order to set up the point-to-multipoint MBMS RB.

When the setup of the lower layer is completed, the terminal RRC inserts point-to-point MBMS RB setup completion information into an RRC RB setup completion message and transmits it to the UTRAN RRC.

Upon receiving the RRC RB setup completion message, the UTRAN RRC commands the lower layer of UTRAN to release the point-to-point MBMS RB. At this time, the point-to-point MBMS RB is a dedicated channel for a specific terminal, the UTRAN RRC should transmit MBMS RB release command as many as the point-to-point MBMS RBs to the lower layer of UTRAN.

Accordingly, after an activation time included in the MBMS RB re-setup information of the received MSIB, if the UTRAN lower layer receives data from the upper layer of the user plane or resumes data transmission which has been temporarily suspended, it transmits the corresponding MBMS data to the specific terminal group through the point-to-multipoint MBMS RB (step S86). The lower layer of the terminal belonging to the corresponding terminal group receives the MBMS data transmitted form the MBMS RB after the activation time included in the MBMS RB setup information and transmits it to the upper layer of the user plane of the lower layer of the terminal.

Release of MBMS RB

Figure 13:
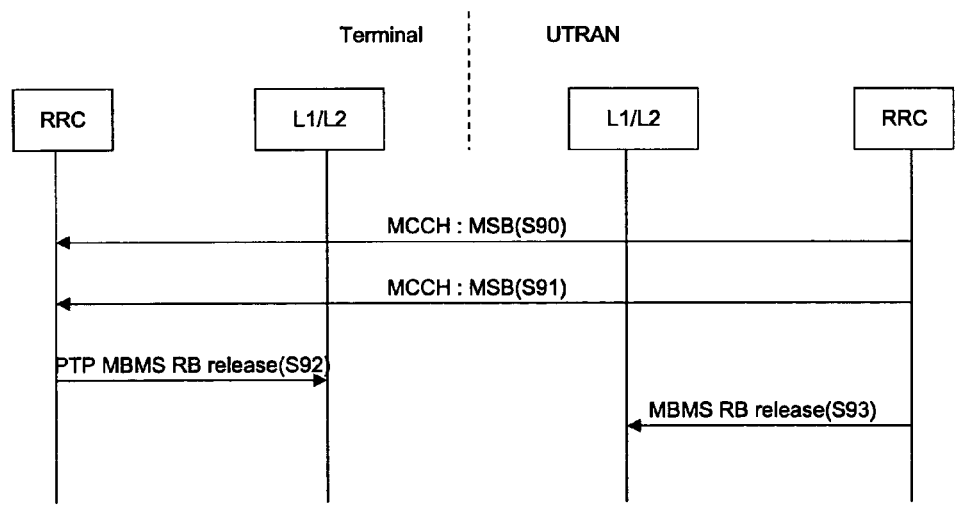
FIG. 13 illustrates a process of releasing a different MBMS RB.

FIG. 13 illustrates a process of releasing a different MBMS RB.

The process of FIG. 13 can be applied both to release of the point-to-multipoint MBMS RB and to the point-to-point MBMS RB. The MBMS RB can be released by using the radio bearer releasing process of the conventional art, but the problem of the conventional art is that every terminal belonging to a specific terminal group should transmit a response message to UTRAN.

A terminal first receives an MSB from the UTRAN RRC and checks whether the MSB has been updated (step S90). If the MSB has been updated, the terminal compares a value of block update information on the corresponding MSIB with a previously stored value. If the two values are different, the terminal obtains scheduling information of the corresponding MSIB.

The terminal receives a specific MSIB according to the scheduling information (step S91). At this time, a terminal group does not receive an unnecessary MSIB. That is, a terminal group which receives a specific MBMS service does not receives any other MSIB than the specific MSIB for the corresponding MBMS service. The MSIB includes an MBMS RB release command for the specific MBMS service.

The RRC of the terminal belonging to the terminal group obtains MBMS RB release information for the specific MBMS service from the received MSIB. The terminal RRC commands the lower layer of the terminal to release the MBMS RB (step S92), and the UTRAN RRC commands the lower layer of UTRAN to release the MBMS RB (step S93).

As so far described, in the case of the MBMS RB, a method is required for setting up a specific RB for terminal groups. In case of setting up an MBMS RB by using the conventional radio bearer setup, messages should be transmitted and received as many as the users belonging to a terminal group, causing a problem that a radio capacity is much occupied.

Therefore, it is advantageous in the aspect of the radio capacity that the MBMS RB is set up in the similar manner of the RB setup through the system information. In addition, in the present invention, the MBMS control information is positioned at a lower position of the system information, so as to be easily applied when the MBMS is newly updated for an existing system.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of receiving a point-to-multipoint service by a mobile terminal belonging to a mobile terminal group corresponding to the point-to-multipoint service, the method comprising:
receiving on a broadcast channel, in a specific System Information Block (SIB), configuration information relating to a control channel only for the point-to-multipoint service;
receiving on the control channel a Radio Resource Control (RRC) radio bearer (RB) message that corresponds to the mobile terminal group, the RRC RB message including channel information and layer information for configuring a packet data convergence protocol (PDCP) layer and a Radio Link Control (RLC) layer;
processing the RRC RB message; and
based on the channel information and layer information in the RRC RB message, receiving the point-to-multipoint service, only at a mobile terminal belonging to the mobile terminal group, on a traffic channel that is a data channel only for the point-to-multipoint service, wherein the broadcast, control and traffic channels are logical channels between the RLC layer and a Medium Access Control (MAC) layer.

2. The method of claim 1, wherein the channel information and the layer information on the control channel are configuration information for receiving the traffic channel; and wherein the point-to-multipoint service is received through the traffic channel after receiving the configuration information for receiving the traffic channel on the control channel.

3. The method of claim 2, further comprising:
receiving via the control channel, a point-to-multipoint service information block containing point-to-multipoint service specific control information, the point-to-multipoint service information block being dedicated to a single point-to-multipoint service; and
receiving via the traffic channel, a single point-to-multipoint service based on the received point-to-multipoint service information block.

4. The method of claim 3, wherein the point-to-multipoint service information block is received at a scheduled time.

5. The method of claim 3, further comprising:
receiving a scheduling block prior to receiving the point-to-multipoint service information block, the scheduling block including information that indicates when the mobile terminal should receive the point-to-multipoint service information block.

6. The method of claim 5, wherein the mobile terminal receives information that indicates when the mobile terminal should receive the scheduling block through the broadcast channel.

7. The method of claim 6, wherein the information that indicates when the mobile terminal should receive the scheduling block is received through the specific SIB.

8. The method of claim 5, wherein the scheduling block is received periodically through the broadcast channel.

9. The method of claim 5, wherein the scheduling block includes information on whether the point-to-multipoint service information block is updated.

10. The method of claim 9, wherein the mobile terminal receives the point-to-multipoint service information block based on whether the information in the point-to-multipoint service information block is updated.

11. The method of claim 5, wherein the scheduling block includes an update tag, the update tag indicating whether the point-to-multipoint service information block is updated.

12. The method of claim 1, wherein the broadcast channel is a Broadcast Control Channel (BCCH).

13. The method of claim 1, wherein the control channel is a Multimedia Broadcast/Multicast Service (MBMS) Control Channel (MCCH).

14. The method of claim 1, wherein the traffic channel is a Multimedia Broadcast/Multicast Service (MBMS) Traffic Channel (MTCH).

15. In a wireless communications network, a method of transmitting a point-to-multipoint service to a mobile terminal belonging to a mobile terminal group corresponding to the point-to-multipoint service, the method comprising:
using a broadcast channel to transmit, in a specific System Information Block (SIB), configuration information relating to a control channel only for the point-to-multipoint service;
using the control channel to transmit a Radio Resource Control (RRC) radio bearer (RB) message that corresponds to the mobile terminal group, the RRC RB message including channel information and layer information for configuring a packet data convergence protocol (PDCP) layer and a Radio Link Control (RLC) layer;
using a traffic channel to transmit the point-to-multipoint service only to a mobile terminal belonging to the mobile terminal group, based on the channel information and layer information in the RRC RB message, the traffic channel being a data channel only for the point-to-multipoint service, wherein the broadcast, control and traffic channels are logical channels between the RLC and a Medium Access Control (MAC) layer.

16. The method of claim 15, wherein the channel information and the layer information are configuration information for transmitting the traffic channel; and the point-to-multipoint service is transmitted through the traffic channel after transmitting the configuration information for transmitting the traffic channel on the control channel.

17. The method of claim 16, further comprising:
transmitting via the control channel, a point-to-multipoint service information block containing point-to-multipoint service specific control information, the point-to-multipoint service information block being dedicated to a single point-to-multipoint service; and
transmitting via the traffic channel, a single point-to-multipoint service based on the transmitted point-to-multipoint service information block.

18. The method of claim 17, further comprising:
repeating the transmission of the point-to-multipoint service information block.

19. The method of claim 17, further comprising: transmitting a scheduling block prior to transmitting the point-to-multipoint service information block, the scheduling block including information that indicates when the mobile terminal should receive the point-to-multipoint service information block.

20. The method of claim 19 further comprising:
transmitting information that indicates when the mobile terminal should receive the scheduling block through the broadcast channel.

21. The method of claim 20, wherein the information that indicates when the mobile terminal should receive the scheduling block is transmitted through the specific SIB.

22. The method of claim 19, wherein the scheduling block is transmitted periodically through the broadcast channel.

23. The method of claim 19, wherein the scheduling block includes information that indicates whether the point-to-multipoint service information block is updated.

24. The method of claim 23, wherein the transmission of the point-to-multipoint service information block is based on whether the information in the point-to-multipoint service information block is updated.

25. The method of claim 19, wherein the scheduling block includes an update tag, the update tag indicating whether the point-to-multipoint service information block is updated.

26. The method of claim 15, wherein the broadcast channel is a Broadcast Control Channel (BCCH).

27. The method of claim 15, wherein the control channel is a Multimedia Broadcast/Multicast Service (MBMS) Control Channel (MCCH).

28. The method of claim 15, wherein the traffic channel is a Multimedia Broadcast/Multicast Service (MBMS) Traffic Channel (MTCH).

29. A mobile terminal belonging to a mobile terminal group corresponding to a point-to-multipoint service, capable of operating in accordance with a radio interface protocol, and capable of receiving the point-to-multipoint service, the mobile terminal comprising:
a Radio Resource Control (RRC) layer adapted to receive, in a specific System Information Block (SIB), on a broadcast channel, configuration information relating to a control channel only for the point-to-multipoint service, the RRC layer further adapted to receive on the control channel, an RRC radio bearer (RB) message that corresponds to the mobile terminal group, the RRC RB message including channel information and layer information for configuring a packet data convergence protocol (PDCP) layer and a Radio Link Control (RLC) layer, the RRC layer further adapted to process the RRC RB message; and
a lower layer cooperating with the RRC layer and, based on the channel information and layer information in the RRC RB message, configured to receive, only at a mobile terminal belonging to the mobile terminal group, the point-to-multipoint service via a traffic channel that is a data channel only for the point-to-multipoint service, wherein the lower layer comprises the RLC layer and a Medium Access Control (MAC) layer, and wherein the broadcast channel, the control channel and the traffic channel are logical channels between the RLC layer and the MAC layer.

30. The mobile terminal of claim 29, wherein the lower layer cooperates with the RRC layer to receive the point-to-multipoint service through the traffic channel after the RRC layer receives the RRC radio bearer (RB) message.

31. The mobile terminal of claim 29, wherein the broadcast channel is a Broadcast Control Channel (BCCH).

32. The mobile terminal of claim 29, wherein the control channel is a Multimedia Broadcast/Multicast Service (MBMS) Control Channel (MCCH).

33. The mobile terminal of claim 29, wherein the traffic channel is a Multimedia Broadcast/Multicast Service (MBMS) Traffic Channel (MTCH).

34. A network supporting a radio interface protocol, and capable of providing a point-to-multipoint service to a mobile terminal belonging to a mobile terminal group corresponding to the point-to-multipoint service, the network comprising:
a Radio Resource Control (RRC) layer adapted to provide configuration information, in a specific System Information Block (SIB), on a broadcast channel, the configuration information, relating to a control channel only for the point-to-multipoint service, the RRC layer further adapted to provide on the control channel, an RRC radio bearer (RB) message that corresponds to the mobile terminal group, the RRC RB message including channel information and layer information for configuring a packet data convergence protocol (PDCP) layer and a Radio Link Control (RLC) layer, and a lower layer cooperating with the RRC layer and, based on the channel information and layer information in the RRC RB message, configured to transmit, only to a mobile terminal belonging to the mobile terminal group, the point-to-multipoint service via a traffic channel that is a data channel only for the point-to-multipoint service, wherein the lower layer comprises the RLC layer and a MAC (Medium Access Control) layer, and wherein the broadcast channel, the control channel and the traffic channel are logical channels between the RLC layer and the MAC layer.

35. The network of claim 34, wherein the lower layer cooperates with the RRC layer to transmit the point-to-multipoint service through the traffic channel after the RRC layer transmits RRC radio bearer (RB) message.

36. The network of claim 34, wherein the broadcast channel is a Broadcast Control Channel (BCCH).

37. The network of claim 34, wherein the control channel is a Multimedia Broadcast/Multicast Service (MBMS) Control Channel (MCCH).

38. The network of claim 34, wherein the traffic channel is a Multimedia Broadcast/Multicast Service (MBMS) Traffic Channel (MTCH).

* * * * *